United States Patent
Masquelier et al.

(10) Patent No.: US 12,304,327 B2
(45) Date of Patent: May 20, 2025

(54) WIRELESS POWER TRANSFER SYSTEM ANALYZER

(71) Applicant: Wireless Advanced Vehicle Electrification, LLC, Salt Lake City, UT (US)

(72) Inventors: Michael Masquelier, Park City, UT (US); Steven Ball, Sandy, UT (US); Arash Rasteh, Herriman, UT (US)

(73) Assignee: WIRELESS ADVANCED VEHICLE ELECTRIFICATION, LLC, Salt Lake City, UT (US)

( * ) Notice: Subject to any disclaimer, the term of this patent is extended or adjusted under 35 U.S.C. 154(b) by 229 days.

(21) Appl. No.: 17/866,250

(22) Filed: Jul. 15, 2022

(65) Prior Publication Data

US 2024/0017621 A1     Jan. 18, 2024

(51) Int. Cl.
*B60L 3/12* (2006.01)
*B60L 7/10* (2006.01)
(Continued)

(52) U.S. Cl.
CPC ...... *B60L 3/12* (2013.01); *B60L 7/10* (2013.01); *B60L 53/12* (2019.02); *B60L 58/10* (2019.02); *B60L 58/14* (2019.02); *G07C 5/0808* (2013.01)

(58) Field of Classification Search
CPC .... B60L 3/12; B60L 7/10; B60L 53/12; B60L 58/10; B60L 58/14; G01C 21/3658;
(Continued)

(56) References Cited

U.S. PATENT DOCUMENTS

2013/0226367 A1* 8/2013 MacNeille .......... B60R 16/0236
                                                           701/1
2015/0019058 A1* 1/2015 Georgiev ................ B60L 58/12
                                                          701/22
(Continued)

OTHER PUBLICATIONS

Yang, S., et al., "Driving-Style-Oriented Adaptive Equivalent Consumption Minimization Strategies for HEVs," Oct. 2018, IEEE Transactions on Vehicular Technology, vol. 67, No. 10, pp. 9249-9261 (Year: 2018).*

*Primary Examiner* — Harry Y Oh
*Assistant Examiner* — Karston G. Evans
(74) *Attorney, Agent, or Firm* — Kunzler Bean & Adamson; Bruce R. Needham

(57) ABSTRACT

Methods, systems, and apparatus, including computer programs encoded on a computer storage medium, for analyzing a wireless power transfer system are disclosed. In one aspect, a method includes the actions of receiving data related to the energy usage of an electric vehicle. The actions further include, based on the data related to the energy usage of the electric vehicle, determining that a problem exists with the electric vehicle. The actions further include, in response to determining that that the problem exists with the electric vehicle, accessing diagnostic data of the electric vehicle. The actions further include, based on the diagnostic data of the electric vehicle and the data related to the energy usage of the electric vehicle, determining a cause of the problem with the electric vehicle. The actions further include providing, for output, data indicating the cause of the problem with the electric vehicle.

17 Claims, 4 Drawing Sheets

(51) Int. Cl.
*B60L 53/12* (2019.01)
*B60L 58/10* (2019.01)
*B60L 58/14* (2019.01)
*G07C 5/08* (2006.01)

(58) Field of Classification Search
CPC ...... G06N 5/022; G06N 20/00; G07C 5/0808; Y02T 10/70
See application file for complete search history.

(56) References Cited

U.S. PATENT DOCUMENTS

| | | | |
|---|---|---|---|
| 2018/0196106 A1* | 7/2018 | Sankavaram | F02N 11/108 |
| 2020/0139843 A1* | 5/2020 | Park | B60L 53/62 |
| 2022/0314810 A1* | 10/2022 | Yokoo | B60L 15/2009 |
| 2023/0177890 A1* | 6/2023 | Salter | G07C 5/0816 |
| | | | 701/29.6 |
| 2023/0298394 A1* | 9/2023 | Pickett | G05B 23/0262 |
| | | | 701/31.4 |
| 2023/0406330 A1* | 12/2023 | Woodbury | B60W 50/14 |
| 2024/0027541 A1* | 1/2024 | Kato | B60L 53/68 |

* cited by examiner

WIRELESS POWER TRANSFER SYSTEM ANALYZER

BACKGROUND

Wireless power transfer is the transfer of electrical power without wires as a physical link. A wireless power transfer system includes a transmitter device and a receiver device. The transmitter device is driven by a power source and generates an electromagnetic field. The receiver device extracts power from the electromagnetic field and supplies the power to an electrical load.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Electric vehicles can exhibit various problems. For some problems, the cause and corresponding solution may be obvious. For example, if a vehicle interior is inadequately lit, the cause may be a burned-out light bulb. The solution may be to replace the burned-out light bulb. Other problems may not have obvious solutions. For example, if the vehicle is using more battery power than it should for a distance traveled, then the cause may include a bad battery, a bad power receiving device, a bad electric motor, and/or other causes. In some instances, it may not be apparent that the vehicle has a problem. This may be the case if the vehicle does not exhibit any observable symptoms.

Because of this difficulty with identifying the causes and corresponding solutions to problems with electric vehicles, electric vehicles and charging devices may be equipped with various sensors that provide data to a server for analysis. The server may use various rules and/or models to analyze the sensor data. The rules may specify ranges and thresholds to compare to the sensor data. If the sensor data satisfies some of the ranges or thresholds, then the server may determine that a particular problem with the vehicle likely exists. The models may be trained using historical data and machine learning. In some instances, the models may be configured to receive the sensor data and output that a particular problem with the vehicle likely exists.

The server may continue to analyze the sensor data in view of an identified problem. This analysis may involve using additional models and/or rules. The additional models and/or rules may identify the likely cause and/or solution to the problem. In some instances, the server may automatically implement the solution to attempt to correct the problem. In other instances, the server may output instructions to implement the solution.

Figure 1:
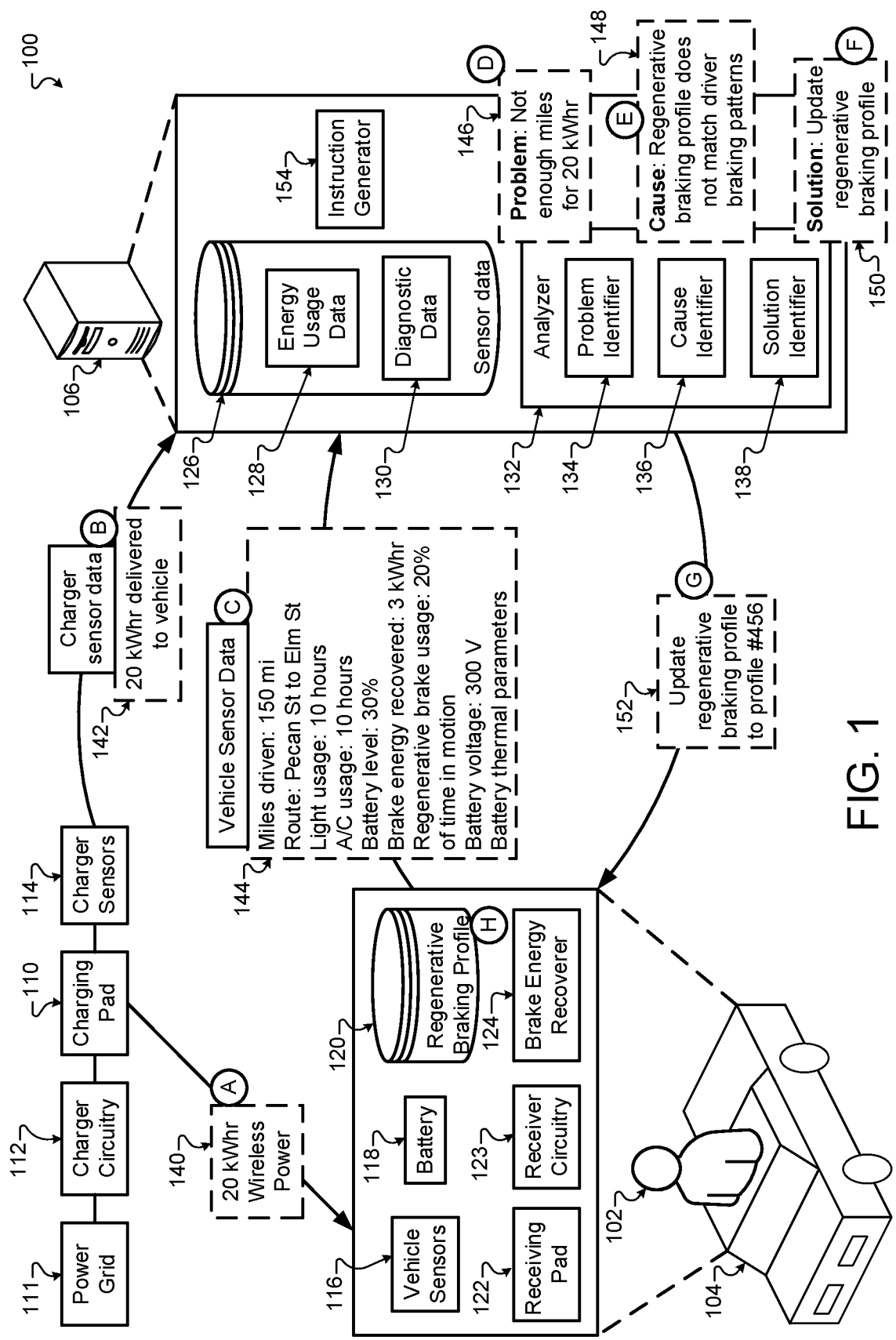
FIG. 1 illustrates an example wireless power transfer system that is configured to determine the cause of an issue with the wireless power transfer system and/or an electric vehicle.

FIG. 1 illustrates an example wireless power transfer system 100 that is configured to determine the cause of an issue with the wireless power transfer system 100 and/or an electric vehicle 104. Briefly, and as described in more detail below, the wireless power transfer system 100 includes a charging pad 110 that is configured to provide power wirelessly to the electric vehicle 104. The electric vehicle 104 may include vehicle sensors 116 that collect vehicle sensor data 144 related to the electric vehicle 104. The charging pad 110 and the associated charger circuitry 112 may communicate with charger sensors 114 that collect charger sensor data 142 related to the charging pad 110 and the associated charger circuitry 112. A server 106 may receive and analyze the vehicle sensor data 144 and the charger sensor data 142 and identify any problems related to the wireless power transfer system 100 and/or the electric vehicle 104. The server 106 may determine a cause and solution of the problem. The server 106 may automatically implement the solution. In some implementations and as discussed below with respect to FIG. 3, the vehicle 104 may be configured to determine the cause and solution of the problem and automatically implement the solution. FIG. 1 includes various stages A through H that may illustrate the performance of actions and/or the movement of data between various components of the wireless power transfer system 100. The wireless power transfer system 100 may perform these stages in any order.

In more detail, the user 102 may be operating the vehicle 104. The vehicle 104 may be any type of motorized vehicle such as a car, truck, van, bus, train, motorcycle, electric bicycle, scooter, tractor, drayage truck, street sweeper, watercraft, electric vertical take-off and landing (eVTOL) aircraft, or any other similar type of vehicle. In some implementations, the vehicle 104 may be any type of device that includes a motor and a battery such as a lawnmower, tiller, generator, snow blower, and/or any other similar type of device.

The vehicle 104 may include a receiving pad 122, a battery 118, and associated receiver circuitry 123. The receiving pad 122 may be configured to receive power wirelessly from a charging pad 110. The charging pad 110 may receive power from the charger circuitry 112 that receives power from the power grid 111. The receiver circuitry 123 may include converters, inverters, and/or control circuitry to transfer power from the receiving pad 122 to the battery 118. The charging pad 110 and the receiving pad 122 may include coils that are configured to wirelessly couple together at a resonant frequency during the transfer of the wireless power 140. The charging pad 110 and the receiving pad 122 may also include magnetic material and/or metal in order to improve the transfer of the wireless power 140 and to prevent the wireless power 140 from affecting or being affected by nearby people, animals, and/or devices. The coils of the charging pad 110 and the receiving pad 122 may resonate at the resonant frequency. At the resonant frequency, the transfer of the wireless power 140 may be more efficient than at other frequencies. In some implementations, the charging pad 110 may be configured to transfer power to the receiving pad 122 without coupling together at the resonant frequency. In some implementations, the vehicle 104 may provide power to various electronic devices such as mobile phones, cameras, power converters, and/or any other similar type of device. These devices may draw power from the battery 118.

The power grid 111 may be operated by a utility company. The utility company may operate a power plant and use transmission lines to deliver power to the charger circuitry 112. The power plant may generate electricity using coal, natural gas, solar, wind, water, and/or any other renewable or nonrenewable source. In some implementations, the charger circuitry 112 may be connected a power source such as solar panels. In this case, the charger circuitry 112 may not be connected to the power grid of a utility company and may receive its power from solar panels that may be in the vicinity of the charger circuitry 112. For example, the solar panels may be on top of a car port that may cover the vehicle 104 when the vehicle 104 is receiving power from the charging pad 110.

The receiving pad 122 may receive the wireless power 140 from the charging pad 110. The charging pad 110 may receive power from the charger circuitry 112. The charger circuitry 112 may include various power conversion, power inversion, and/or control circuitry that transfers power from the power grid 111 to the charging pad 110. The charging pad 110 and charger circuitry 112 may be configured to transfer power at various rates, such as eleven, fifty, one hundred, and/or five hundred kilowatts. In the example of FIG. 1 and in stage A, the charging pad 110 may transfer twenty kilowatt-hours of wireless power to the receiving pad 122. The receiving pad 122 may provide the wireless power 140 as alternating current power to a converter of the receiver circuitry 123 that converts the alternating current power of the wireless power 140 to direct current power. The charging pad 110 may provide the twenty kilowatt-hours of wireless power to the converter of the receiver circuitry 123 less some energy that may be lost as heat, leakage, rectification, or through other inefficiencies in the vehicle 104. The converter of the receiver circuitry 123 may store the approximately twenty kilowatt-hours of wireless power in the battery 118.

The charger sensors 114 may be configured to collect charger sensor data 142 that reflects characteristics and operations of the charging pad 110 and/or the charger circuitry 112. The charger sensors 114 may include various types of sensors such as power meters that measure the power provided by the power grid 111 to the charger circuitry 112, power provided by the charger circuitry 112 to the charging pad 110, and power provided by the charging pad 110 for receipt by the receiving pad 122. The power meters may also measure power provided to other vehicles. The charger sensors 114 may include thermometers that measure the ambient temperature and/or the temperature of any component of the charging pad 110 and/or the charger circuitry 112. The charger sensors 114 may also include location sensors that determine the location of the charging pad 110 and/or the charger circuitry 112, a hygrometer that measures the moisture content of the ambient air and/or the air inside any component of the charging pad 110 and/or the charger circuitry 112 such as inside the charging pad 110, and/or a water sensor that may detect the presence of water in and/or around the charging pad 110 and/or the charger circuitry 112, to name just some examples. The charger sensors 114 may also include alignment sensors that detect an orientation between the charging pad 110 and the receiving pad 122. For example, an alignment sensor may determine that the centers of the charging pad 110 and the receiving pad 122 are offset by three inches and/or that the charging pad 110 and the receiving pad 122 are seven inches apart. In addition, the charger sensors 114 may timestamp the charger sensor data 142. The timestamps may indicate a date and time at which a sensor detected a certain condition and may also indicate the charging activity of the charging pad 110. For example, the timestamps may indicate that the charging pad 110, which may be capable of outputting eleven kilowatts, was outputting seven kilowatts at a first time and for a period after the first time and outputting ten kilowatts at a second time and for a period after the second time.

As illustrated in FIG. 1 and in stage B, the charger sensors 114 may provide the charger sensor data 142 to the server 106. For example, the charger sensors 114 may provide the charger sensor data 142 continuously or at intervals during charging of a vehicle, or over a period of time at periodic intervals such as every hour. The charger sensors 114 may provide the charger sensor data 142 to the server 106 during or after charging the vehicle 104 or any other vehicle, for example, in real time, or at any other time. In some embodiments, the charger sensor data 142 may indicate the amount of power (e.g., 20 kWhr) transferred by the charging pad 110 to the receiving pad 122 of the vehicle 104.

The vehicle sensors 116 may be configured to collect vehicle sensor data 144 that reflects characteristics and operations of the vehicle 104. For example, the vehicle sensors 116 may include an odometer that measures the number of miles driven by the vehicle 104 and/or the number of miles driven by the vehicle 104 since the last charge from the charging pad 110 or another similar charging device. The vehicle sensors 116 may also include a location sensor that determines the location of the vehicle 104, vehicle accessory monitors that may monitor the usage of various accessories of the vehicle 104 (such as headlights, interior lights, air conditioning systems, heating systems, audio recording and output systems, video recording and output systems, automatic door operators, and/or any other similar vehicle accessory), battery level monitors that measure the capacity of the battery 118 and the remaining power left in the battery 118, a voltmeter that measures the voltage of the battery 118, various thermometers that measure the temperature of various components of the vehicle 104 (for example, the temperature of various portions of the battery 118, various portions of the motor, the ambient temperature, and any other similar locations), a hygrometer that measures the moisture content of the ambient air and/or the air inside any component of the vehicle 104, a water sensor that may detect the presence of water in and/or around any component of the vehicle 104 including the receiving pad 122, etc. The vehicle sensors 116 also may timestamp the vehicle sensor data 144. The timestamps may indicate a date and time at which a sensor detected a certain condition.

The vehicle 104 may include a brake energy recoverer 124 that is part of a regenerative braking system. The brake energy recoverer 124 may be a component that slows down (i.e., decelerates) the vehicle 104 and converts kinetic energy of the vehicle 104 into energy that can be stored in the battery 118. The vehicle 104 may also include a typical braking system that slows the vehicle using disk brakes and/or drum brakes. The brake energy recoverer 124 may operate according to the regenerative braking profile 120. The regenerative braking profile 120 may specify a time and/or location to activate the brake energy recoverer 124. More specifically, the regenerative braking profile 120 may specify to activate the brake energy recoverer 124 to decelerate the electric vehicle 104 based on a distance between the electric vehicle 104 and a predetermined location. For example, if the vehicle 104 is a bus and is approaching a bus stop, then the regenerative braking profile 120 may specify to slow the vehicle 104 as the vehicle 104 approaches the bus stop. In some implementations, the regenerative braking profile 120 may specify how the brake energy recoverer 124 works in conjunction with the brake foot pedal with which the user 102 interacts. This cooperation between the brake energy recoverer 124 and the brake foot pedal may be related to the location of the vehicle 104. For example, if the vehicle 104 is within a certain range of or within a threshold distance from a bus stop based on a predetermined bus route and location data and the user 102 presses the brake foot pedal, then the regenerative braking profile 120 may specify to activate the brake energy recoverer 124. If the vehicle 104 is closer to the bus stop than the lower end of the range, then the regenerative braking profile 120 may include instructions not to activate the brake energy recoverer 124 or not include any instructions for that scenario. In some implementations, the regenerative braking profile 120 may include instructions to activate the brake energy recoverer 124 based on an amount of pressure applied to the brake foot pedal. Pressure above a certain threshold may indicate that the user 102 is attempting to stop the vehicle 104 quickly. In this case, the regenerative braking profile 120 may specify to not activate the brake energy recoverer 124. Pressure below a certain threshold may indicate that the user 102 is attempting to stop the vehicle 104 slowly. In this case, the regenerative braking profile 120 may specify to activate the brake energy recoverer 124. The brake energy recoverer 124 may be configured to decelerate the vehicle 104 slowly. Increased pressure on the brake pedal may be an indication that the user 102 is attempting to slow the vehicle 104 quickly. In this case, the conventional brakes may engage causing most of the kinetic energy of the vehicle 104 to be lost as heat instead of captured by the brake energy recoverer 124.

The regenerative braking profile 120 may be specific to the driving habits of the user 102. The regenerative braking profile 120 may specify to activate the brake energy recoverer 124 more often while not compromising the safety of the vehicle 104. Because different users may use the brakes differently in different situations, the regenerative braking profile 120 may be tailored to take into account the brake usage of different users. In some instances, the regenerative braking profile 120 may be route dependent. In the case of busses, one regenerative braking profile 120 may be used when the user 102 is driving a first bus route and another regenerative braking profile 120 may be used when the user 102 is driving a second bus route. Each user may have a different regenerative braking profile for the same bus route.

The vehicle 104 may receive the regenerative braking profiles 120 from various sources. For example, vehicle 104 may be preloaded with a regenerative braking profile 120 at the time of manufacture. This regenerative braking profile 120 may specify under what situations to engage the brake energy recoverer 124. As another example, the vehicle 104 may receive an update to the regenerative braking profile 120 from a server. This may be in response to an issue with the vehicle 104 and/or an improvement to the regenerative braking profile 120. The regenerative braking profiles 120 may include multiple profiles. These profiles may be preloaded during manufacture and/or received and/or updated from a server at a later time. The vehicle 104 may activate a regenerative braking profile 120 based in determining an identity of the user 102, the location of the vehicle 104, the type of vehicle 104, the route of the vehicle 104, and/or any other similar data.

The vehicle sensors 116 may include a brake energy recoverer monitor that is configured to monitor the usage of the brake energy recoverer 124. The brake energy recoverer monitor may collect data related to the time periods when the brake energy recoverer 124 is active. The brake energy recoverer monitor may also monitor the usage of the conventional brakes and the interaction between the user 102 and the brake pedal and/or the gas pedal. The brake energy recoverer monitor may also be configured to collect data related to the amount of energy recovered by the brake energy recoverer 124 and stored in the battery. The data related to the brake energy recoverer 124 may be included in the vehicle sensor data 144 and may also be timestamped in order to correlate the data related to the brake energy recoverer 124 with data from the other vehicle sensors 116.

As illustrated in FIG. 1 and in stage C, the vehicle 104 may provide the vehicle sensor data 144 to the server 106. The vehicle sensor data 144 may be provided during charging or at periodic intervals such as every hour, in response to a request from the server 106, after receiving wireless power 140 from the charging pad 110, or at any other time. The vehicle sensor data 144 may indicate the distance that the vehicle 104 has driven (e.g., one hundred fifty miles), the path that the vehicle 104 has been driven (e.g., along Pecan Street and Elm Street), and/or other information (e.g., the interior lights have been on for ten hours, the air conditioning has been used for ten hours, the battery level is thirty percent, three kilowatt hours of power have been recovered from the brake energy recoverer 124 and stored in the battery 118, the brake energy recoverer 124 has been active for twenty percent of the time that the vehicle 104 has been in motion, and the voltage of the battery 118 is three hundred volts). The vehicle sensor data 144 may also include various battery thermal parameters that indicate the temperature of various cells of the battery 118.

The server 106 may receive and analyze the charger sensor data 142 and the vehicle sensor data 144. Based on analyzing the charger sensor data 142 and the vehicle sensor data 144, the server 106 may be able to determine whether there is a problem with the vehicle 104, charging pad 110, and/or the charger circuitry 112. The server 106 may determine the cause of the problem and a solution. In some implementations, the server 106 may output the solution. In some implementations, the server 106 may automatically implement the solution.

The server 106 may include sensor data storage 126. The sensor data storage 126 may be implemented by memory or another storage device accessible by the server 106. The sensor data storage 126 may store the charger sensor data 142 and the vehicle sensor data 144. The sensor data storage 126 may differentiate between energy usage data 128 and diagnostic data 130. The energy usage data 128 may include data related to the power supplied by the power grid 111, power supplied by the charger circuitry 112, energy consumed by the charging pad 110, wireless power 140 transferred between the charging pad 110 and the receiving pad 122, power transferred from the receiving pad 122 to the battery 118, miles driven, route traveled, battery percentage, and/or any other similar data. The diagnostic data 130 may include data related to the surroundings and characteristics of the vehicle 104, the charger circuitry 112, and the charging pad 110. For example, the diagnostic data 130 may include data related to temperatures, accessory usage, battery 118 voltage, brake energy recoverer 124 usage, humidity, water presence, and/or any other similar data.

In some implementations, the server 106 may be configured to store data received from particular sensors in either the energy usage data 128 or the diagnostic data 130. For example, the server 106 may store data received from thermometers in the diagnostic data 130 and data received from the power meters to the energy usage data 128. In some implementations, the sensor data storage 126 may store the charger sensor data 142 and the vehicle sensor data 144 without differentiating between the energy usage data and the diagnostic data.

The server 106 may include an analyzer 132. The analyzer 132 may be configured to analyze the sensor data using the problem identifier 134, the cause identifier 136, and the solution identifier 138. The problem identifier 134 may determine whether there is a problem 146 with the charging pad 110, the charger circuitry 112, and/or the vehicle 104. If there is a problem, then the cause identifier 136 may determine the cause 148 of the problem 146. The solution identifier 138 may determine the solution 150 to remove or remedy the cause 148 and correct the problem 146. In some examples, the server 106 may automatically implement the solution 150. In some examples, the server 106 may output a recommendation to implement the solution 150.

The problem identifier 134 may analyze the energy usage data 128 and/or the diagnostic data 130 using various sensor data analysis rules and/or sensor data analysis models. The sensor data analysis rules and sensor data analysis models will be discussed in more detail below. Briefly, the sensor data analysis models may be configured to receive at least a portion of the energy usage data 128 and/or at least a portion of the diagnostic data 130. The sensor data analysis models may be configured to output data identifying a problem that may likely exist with the vehicle 104, the charging pad 110, and/or the charger circuitry 112. The sensor data analysis models may also identify a likely problem. Different sensor data analysis models may be configured to analyze different types of data. For example, a first sensor data model may be configured to analyze the energy usage data 128 and output data identifying a problem with the vehicle 104, the charger circuitry 112, and/or the charging pad 110. A second sensor data model may be configured to analyze the energy usage data 128 and diagnostic data 130 and output data identifying a problem with the vehicle 104, the charger circuitry 112, and/or the charging pad 110.

The sensor data rules may specify various ranges and/or thresholds for different types of sensor data. Based on which side of a threshold or on which range the value of a portion of the sensor data may be located, the sensor data rules may determine that a specific problem may exist with the vehicle 104, the charger circuitry 112, and/or the charging pad 110. Different sensor data rules may include ranges and thresholds for different types of data and may specify different types of problems with the vehicle 104, the charger circuitry 112, and/or the charging pad 110. In some implementations, the sensor data rules may identify more than one problem with the vehicle 104, the charger circuitry 112, and/or the charging pad 110.

In the example of FIG. 1 and in stage D, the problem identifier 134 may analyze the energy usage data 128 and/or the diagnostic data 130 using the sensor data analysis rules and/or sensor data analysis models. Based on the data included in the vehicle sensor data 144 and the charger sensor data 142, the problem identifier 134 may select a sensor data analysis model that is configured to receive data indicating one or more of the wireless power provided from the charging pad 110, the miles driven, the route, the accessory usage, the battery 118 level, the brake energy recoverer 124 usage, the battery voltage, and the various battery thermal parameters. The vehicle sensor data 144 and the charger sensor data 142 may include data for each of these fields at various points in time such as the time of charging. The sensor data analysis model may output the problem 146 indicating that the vehicle 104 mileage is too low for twenty kilowatt hours of energy provided to the vehicle 104 that used about fifty percent of the power in the battery 118. The problem identifier 134 may determine that the battery charge increased by fifty percent from thirty percent to eighty percent when the charging pad 110 provided twenty kilowatt hours of power to the vehicle 104. Because the current battery percentage is thirty percent, the problem identifier 134 may determine that the vehicle 104 consumed about twenty kilowatt hours of power from the battery 118. The problem identifier 134 may identify a data analysis rule that indicates a minimum number of miles that the vehicle should travel using twenty kilowatt hours of power. That minimum number of miles may be one hundred seventy miles. In this case, the problem identifier 134 may identify the likely problem 146 being that the miles traveled by the vehicle 134 is too low for twenty kilowatt hours of energy provided to the vehicle 104.

The cause identifier 136 may be configured to analyze the energy usage data 128, the diagnostic data 130, and/or the problem 146 using various sensor data analysis rules and/or sensor data analysis models. In some implementations, the sensor data analysis rules may specify a cause 148 that corresponds to the problem 146. For example, the problem 146 may indicate that the passenger area of the vehicle 104 is too dark. A sensor data analysis rule may indicate that the cause of this problem is a burned out light bulb. Other problems may not correspond to a precise cause. In this case, the sensor data analysis rules and/or the sensor data analysis models may be used by the cause identifier 136 to analyze the energy usage data 128, the diagnostic data 130, and/or the problem 146 to determine one or more likely causes 148.

The cause identifier 136 may select sensor data analysis rules and/or the sensor data analysis models that are configured to receive the energy usage data 128, the diagnostic data 130, and/or the problem 146. The sensor data analysis rules and/or the sensor data analysis models may be similar to those used by the problem identifier 134 in that they are configured to analyze the energy usage data 128 and/or the diagnostic data 130. The sensor data analysis rules and/or the sensor data analysis models used by the cause identifier 136 may also be configured to analyze the problem 146. In some implementations, the cause identifier 136 may select the sensor data analysis rules and/or the sensor data analysis models based on the problem 146. These sensor data analysis rules and/or the sensor data analysis models may be configured to analyze energy usage data 128 and the diagnostic data 130 based on a likely problem 146.

In the example of FIG. 1 and in stage E, the cause identifier 136 may receive the problem 146 from the problem identifier 134 indicating that the vehicle 104 did not travel far enough for consuming twenty kilowatts of power. The cause identifier 136 may access the energy usage data 128 and/or the diagnostic data 130. The cause identifier 136 may select a sensor data analysis model that is configured to identify a cause of the vehicle 104 not traveling far enough based on the received power. The selected sensor data analysis model may be configured to output a likely cause 148 of the problem 146. The cause 148 may be that the regenerative braking profile does not match the braking patterns of the user 102. This may be because the brake energy recoverer 124 may be expected to recover a certain amount of energy that would allow the vehicle 104 to travel more than one hundred fifty miles on twenty kilowatt hours of power.

Additionally, or alternatively, the cause identifier 136 may select a sensor data analysis rule that is configured to identify a cause of the vehicle 104 not traveling far enough based on the received power. The selected sensor data analysis rule may specify various ranges and/or thresholds for various portions of the energy usage data 128 and/or the diagnostic data 130. The selected sensor data analysis rule may specify that if the route of the vehicle 104 was along the Pecan Street and Elm Street route, then the brake energy recoverer 124 should be used for at least thirty percent of the time and the energy recovered should be at least five kilowatt hours. The selected sensor data analysis rule may indicate that if either the brake energy recoverer 124 was not used for at least thirty percent of the time or the energy recovered was less than five kilowatt hours, then the cause 148 may be that the regenerative braking profile does not match the braking patterns of the user 102.

The solution identifier 138 may be configured to analyze the energy usage data 128, the diagnostic data 130, the problem 146, and/or the cause 148 using various sensor data analysis rules and/or sensor data analysis models. In some implementations, the sensor data analysis rules and/or sensor data analysis models may specify a solution 150 that solves the problem 146 and/or the cause 148. For example, the cause 148 may indicate that a light bulb in the passenger area is burned out. From the results of running sensor data analysis rule(s) and/or sensor data analysis model(s), the solution identifier 138 may indicate that the solution to address this cause is to replace the light bulb. Other causes may not correspond to a precise solution. In this case, the sensor data analysis rules and/or the sensor data analysis models may analyze the energy usage data 128, the diagnostic data 130, the problem 146, and/or the cause 148 to determine one or more likely solutions 150.

The solution identifier 138 may select sensor data analysis rules and/or the sensor data analysis models that are configured to receive the energy usage data 128, the diagnostic data 130, the problem 146, and/or the cause 148. The sensor data analysis rules and/or the sensor data analysis models may be similar to those used by the problem identifier 134 and the cause identifier 136 in that they are configured to analyze the energy usage data 128 and/or the diagnostic data 130. The sensor data analysis rules and/or the sensor data analysis models used by the solution identifier 138 may also be configured to analyze the problem 146 and/or the cause 148. In some implementations, the solution identifier 138 may select the sensor data analysis rules and/or the sensor data analysis models based on the problem 146 and/or the cause 148. These sensor data analysis rules and/or the sensor data analysis models may be configured to analyze energy usage data 128 and the diagnostic data 130 with the problem 146 and/or the cause 148 being known.

In the example of FIG. 1 and in stage F, the solution identifier 138 may receive the cause 148 from the cause identifier 136 indicating that the regenerative braking profile does not match the braking patterns of the user 102. In some implementations, the solution identifier 138 may receive the problem 146 from the cause identifier 136 or the problem identifier 134. The solution identifier 138 may access the energy usage data 128 and/or the diagnostic data 130. The solution identifier 138 may select a sensor data analysis model that is configured to identify a solution for the cause of the regenerative braking profile not matching the braking patterns of the user 102. The selected sensor data analysis model may be configured to output a solution 150 for the cause 148. The solution 150 may be to update the regenerative braking profile 120 to a profile that matches the driving habits of the user 102.

Additionally, or alternatively, the solution identifier 138 may select a sensor data analysis rule that is configured to identify a solution of the regenerative braking profile not matching the braking patterns of the user 102. The sensor data analysis rule may specify various ranges and/or thresholds for various portions of the energy usage data 128 and/or the diagnostic data 130. The selected sensor data analysis rule may specify that if the regenerative braking profile does not match the braking patterns of the user 102 and the target energy recovered by the brake energy recoverer 124 is within fifty percent of the actual brake energy recovered, then the solution 150 is to update the regenerative braking profile 120 to a profile that matches the driving habits of the user 102.

In stage G, the instruction generator 154 of the server 106 may generate instructions 152 for the vehicle 104 to implement the solution 150. Depending on the solution 150, the instruction generator 154 may access additional data that may be located on another computing device or stored on the server 106. In the example of FIG. 1, the solution identifier 138 generates the solution 150 of updating the regenerative braking profile 120 to a profile that matches the driving habits of the user 102. In this case, the instruction generator 154 may access various regenerative braking profiles to identify the regenerative braking profile #456 that corresponds to the user 102. If a regenerative braking profile does not correspond to the user 102, then the solution identifier 138 may compare the driving habits of the user 102 as reflected in the vehicle sensor data 144 to identify the regenerative braking profile #456 that matches the driving habits of the user 102.

The instruction generator 154 may provide the instructions 152 to the vehicle 104. The instructions 152 may include the new regenerative braking profile #456 to begin using with the user 102 driving the vehicle 104. The instructions 152 may instruct the vehicle 104 to replace the regenerative braking profile 120 with the new regenerative braking profile #456 included in the instructions 152.

In some implementations, the instructions 152 may instead be a recommendation. In this case, the recommendation may indicate to replace the regenerative braking profile 120 with the new regenerative braking profile #456 included in the recommendation. In some implementations, the recommendation may not include the new regenerative braking profile #456 and may indicate to replace the regenerative braking profile 120 with a regenerative braking profile that corresponds to the user 102.

In some implementations, the solution identifier 138 may determine whether the solution 150 is something that the server 106 can automatically implement. If the solution 150 is something that the server 106 can automatically implement, then the server 106 may generate instructions 152 with which the vehicle 104 or another computing device should comply. For example, updating software, activating hardware, and/or deactivating hardware may be actions that the server 106 can automatically implement. This may include altering switches in the charger circuitry 112, altering switches in the receiver circuitry 123, and/or adjusting the wattage of power provided to the vehicle 104 from the charging pad 110 or other charging pads. These actions may occur in response to the instruction generator 154 transmitting instructions to the vehicle 104 or the charger circuitry 112 for automatic implementation. Other actions such as training the user 102 may be actions that the server 106 can recommend but not automatically implement.

In stage H, the vehicle 104 receives the instructions 152. Based on the instructions 152, the vehicle 104 may update the regenerative braking profile 120 with the new regenerative braking profile #456 as specified by the instructions 152.

In the case where the instructions 152 include a recommendation, the vehicle 104 may output the recommendation to a display and/or another computing device such as a mobile phone, laptop computer, tablet, and/or any other similar computing device. A user may view the recommendation and indicate whether the recommendation will be implemented. The server 106 may receive data indicating whether the instruction 152 was successfully implemented or whether a user agreed to comply with the recommendation. The server 106 may store the data indicating whether the instruction 152 was successfully implemented or whether a user agreed to comply with the recommendation. The problem identifier 134, the cause identifier 136, and the solution identifier 138 may use that data when identifying subsequent problems, causes, and solutions.

In some implementations, the charger sensor data 142 may not be directly provided to the server 106 from the charger sensors 114 and the vehicle sensor data 144 may not be directly provided to the server 106 from the vehicle 104. The charger sensors 114 may provide the charger sensor data 142 to the vehicle 104. The vehicle 104 may provide the charger sensor data 142 and the vehicle sensor data 144 to the server 106. Additionally, or alternatively, the vehicle 104 may provide the vehicle sensor data 144 to the charger circuitry 112 and/or the charger sensors 114. The charger circuitry 112 and/or the charger sensors 114 may provide the charger sensor data 142 and the vehicle sensor data 144 to the server 106. In some implementations, the charger sensors 114 and/or the vehicle 104 may provide the charger sensor data 142 and/or the vehicle sensor data 144 to an intermediate device. The intermediate device may provide the charger sensor data 142 and/or the vehicle sensor data 144 to the server 106. The intermediate device may be any type of device that is capable of communicating with the charger sensors 114, vehicle 104, and the server 106. For example, the intermediate device may be a mobile phone, tablet, smart watch, laptop computer, desktop computer, and/or any other similar device.

Figure 2:
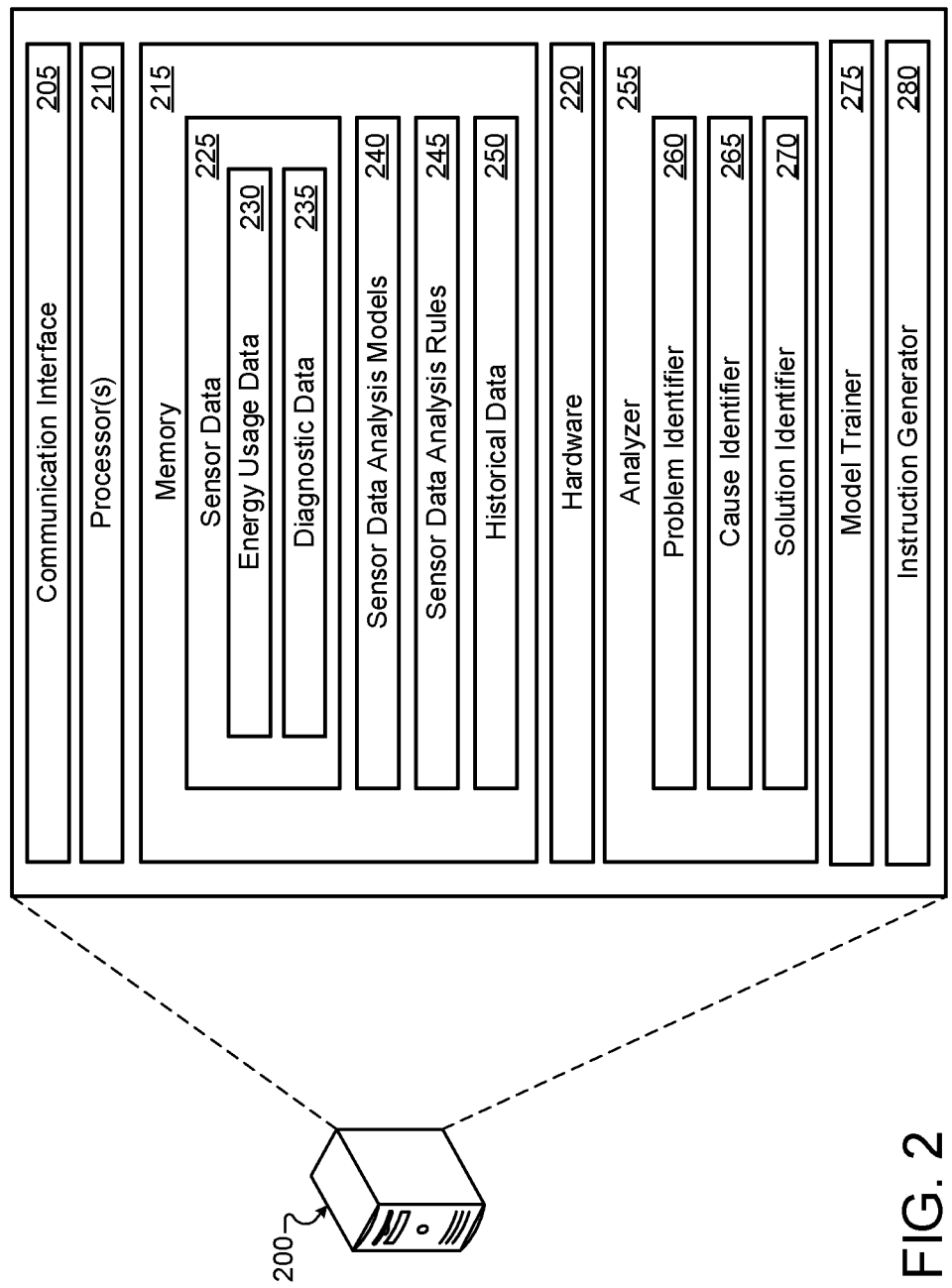
FIG. 2 illustrates an example server that is configured to determine the cause of an issue with a wireless power transfer system and/or an electric vehicle.

FIG. 2 illustrates an example server 200 that is configured to determine the cause of an issue with a wireless power transfer system or electric vehicle. The server 200 may be any type of computing device that is configured to communicate with other computing devices. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 106 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from other devices and networks. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as non-transitory computer-readable storage media. The memory 215 may include a plurality of computer-executable components that are executable by the one or more processors 210 to perform a plurality of actions. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The memory 215 may store sensor data 225. The sensor data 225 may be similar to the sensor data of FIG. 1. Like the sensor data of FIG. 1, the sensor data 225 may include energy usage data 230 and diagnostic data 235. The energy usage data 230 may be similar to the energy usage data 128 of FIG. 1, and the diagnostic data 235 may be similar to the diagnostic data 130 of FIG. 1. The sensor data 225 may store data related to multiple vehicles. The communication interface 205 may receive data for storage in the sensor data 225. The processor(s) 210 may determine whether that data should be stored in the energy usage data 230 or the diagnostic data 235. In some implementations, the sensor data 225 may not differentiate between the energy usage data 230 or the diagnostic data 235. In this case, the communication interface 205 may receive data for storage in the sensor data 225. The processor(s) 210 may store that data in the sensor data 225. In some implementations, the processor(s) 210 may timestamp the received data to indicate when the server 200 received the sensor data 225. In some implementations, the received data may already be timestamped by the collecting device to indicate the date and time when the data was collected.

The one or more processors 210 may implement the analyzer 255. The analyzer 255 may be similar to the analyzer 132 of FIG. 1. Like the analyzer 132, the analyzer 255 may be configured to analyze the sensor data 225 using the problem identifier 260, the cause identifier 265, and the solution identifier 270. The problem identifier 260 may be similar to the problem identifier 134 of FIG. 1. The cause identifier 265 may be similar to the cause identifier 136 of FIG. 1. The solution identifier 270 may be similar to the solution identifier 138 of FIG. 1. The problem identifier 260 may analyze the energy usage data 230 and/or the diagnostic data 235 related to a vehicle to determine whether there are any problems with that vehicle. If the problem identifier 260 detects a problem, then the cause identifier 265 may analyze the problem, the energy usage data 230, and/or the diagnostic data 235 to determine the cause of the problem with the vehicle. The solution identifier 270 may analyze the problem, cause, the energy usage data 230, and/or the diagnostic data 235 to determine the solution to the cause of the problem with the vehicle. The problem identifier 260, the cause identifier 265, and the solution identifier 270 may use the sensor data analysis models 240 and/or the sensor data analysis rules 245 to analyze the problem, cause, the energy usage data 230, and/or the diagnostic data 235.

The one or more processors may implement the instruction generator 280. The instruction generator 280 may be similar to the instruction generator 154 of FIG. 1. The instruction generator 280 may receive the solution from the solution identifier 270. The instruction generator 280 may determine whether the solution can be automatically implemented by a hardware or software component of the vehicle or the charging circuitry. For example, if the solution is updating software, then the instruction generator 280 can generate the instruction that includes the software update along with instructions to update the software. If the solution is altering various switches, then the instruction generator 280 may determine whether the switches can be remotely altered. If the switches can be remotely altered, then the instruction generator 280 may generate and transmit an instruction to alter the switches.

The one or more processors 210 may implement a model trainer 275. The model trainer 275 may be configured to train the sensor data analysis models 240 using machine learning and the historical data 250 and generate the sensor data analysis rules 245 using the historical data 250. The memory 215 may store the historical data 250. The historical data 250 may store data similar to the sensor data 225 that is related to various vehicles. Portions of the historical data 250 may include labels that identify whether the portions are related to a specific problem, cause, and/or solution. Other portions of the historical data 250 may include labels indicating whether the portions are not related to a specific problem, cause, and/or solution.

The historical data 250 may be grouped according to vehicle or types of vehicles. The historical data 250 may include energy usage data 230 and diagnostic data 235 received from each vehicle. The energy usage data 230 and diagnostic data 235 for each vehicle may also be grouped with energy usage data 230 and diagnostic data 235 received from various chargers that provided power to the vehicle. The energy usage data 230 and diagnostic data 235 received from various chargers may be grouped with the energy usage data 230 and diagnostic data 235 from a vehicle before, during, and after providing power to the vehicle. In some implementations, the before period may include any period before charging the vehicle and after charging another vehicle. The after period may include any period after charging the vehicle and before charging another vehicle.

The energy usage data 230 and diagnostic data 235 may include timestamps that indicate when the corresponding sensors collected the data. The energy usage data 230 and diagnostic data 235 may also include data related to any identified problem, cause, and/or solution. In some implementations, the energy usage data 230 and diagnostic data 235 may be labeled once the problem, cause, and/or solution are known. The identification of the problem, cause, and/or solution may come from a user analyzing a previous problem, cause, or solution. For example, the sensors of a vehicle may be providing sensor data to the server 200 for several days. After a period, a user may identify a problem with the vehicle. The user may determine a cause of the problem and a solution. With the problem, cause, and solution identified, the user may determine the period of time when the problem existed. The user or another user may associate the problem, cause, and solution with the portion of the energy usage data 230 and diagnostic data 235 for that vehicle corresponding to the period of time when the problem existed. Portions of the energy usage data 230 and diagnostic data 235 that do not correspond to problem, cause, and solution may be labeled as no problem, cause, and/or solution.

The sensor data 225 may contain various types of data collected from vehicles and chargers. The sensor data received from a vehicle may include location data, accessory usage data, brake pedal usage data, throttle usage data, steering wheel position data, speed data, passenger load data, battery level data, interior temperature data, motor temperature, receiving pad temperature, battery temperature data for the entire battery and/or for each battery cell, exterior temperature data, battery voltage, volumetric heat generation of the battery, conduction—convection parameter of the battery, Reynolds number of the battery, an aspect ratio of the battery, battery percentage remaining, energy recovered from a brake energy recoverer, data identifying a driver, data identifying a regenerative braking profile, battery capacity, wireless energy received, energy stored in the battery, previous charging locations, orientation between charging pad and receiving pad, distance between charging pad and receiving pad, humidity data inside the vehicle, humidity data outside the vehicle, humidity data in or near any portion of the receiving pad, motor, or battery, water presence data inside the vehicle, water presence data outside the vehicle, water presence data in or near any portion of the motor, receiving pad, or battery, and/or any other similar data. The accessories may include headlights, air conditioner, heater, interior lights, defrost, audio players, navigation equipment, door operation, public announcement system, and/or any other similar types of accessories. The sensor data received from a charger may include location data, data identifying charged vehicles, wireless energy provided, energy received from a power supply, temperature data in and/or near any portion of the charging pad or charger circuitry, humidity data in and/or near any portion of the charging pad or charger circuitry, water presence data in and/or near any portion of the charging pad or charger circuitry, pressure data indicating pressure received from any exterior object such as a vehicle, and/or any other similar information. Any of the sensor data received from a vehicle and/or the charger may include timestamps that indicate a date and time during which the corresponding sensor detected the data. The sensor data received from the charger and/or the vehicle may include a subset of the collected sensor data.

The model trainer 275 may group the historical data 250 into data samples. Each data sample may represent the state of a vehicle and/or a charger at a point in time. A data sample may include the sensor data collected from the vehicle at that point in time and sensor data collected from a charger from which the vehicle is receiving or previously received wireless power. Each data sample may also include a data label identifying a problem and/or cause of the problem that existed at that time with the vehicle and/or a charger. The data sample may also include the solution used to correct the problem and/or cause. If the period of time for the data sample does not correspond to a problem and/or cause, then the data sample may include a data label indicating that no problem and/or cause exists.

The model trainer 275 may group the data samples into various training groups. The model trainer 275 may use the training groups to train models using machine learning. The resulting models may be configured to receive sensor data and output data indicating a problem, cause, and/or solution. If there is no problem, cause, and/or solution, then the model may output data indicating that there is no problem, cause, and/or solution. The model trainer 275 may group the data samples into the training groups according to various characteristics. For example, the model trainer 275 may form training groups that include data samples for the same vehicle, the same vehicle manufacturer, the same model of vehicle, vehicles with the same type of battery, vehicles with the same type of receiving pad, the same type of vehicle (e.g., bus, car, motorcycle, etc.), vehicles that charged at the same charger, vehicles that charged at the same type of charger, vehicles that charged at a charger with the same type of charging pad, and/or any other similar group.

The model trainer 275 may include different labels for each data sample depending on the intended output of the resulting model. For example, if the intended output of the model is to identify the problem, the model trainer may include the corresponding problem label with each data sample. If the intended output of the model is the cause, then the model trainer may include the corresponding cause, and optionally the problem, with each data sample. If the intended output of the model is the solution, then the model trainer may include the corresponding solution and optionally problem and/or cause with each data sample.

Each data sample may be cumulative up to the previous charge by the vehicle. In this way, the charging of the vehicle may be time equals zero. A first data sample may include the sensor data collected at this time and any corresponding labels. A second data sample may represent time equals one and may include the sensor data of the first data sample and the additional sensor data collected at time equals one. A third data sample may represent time equals two and may include sensor data of the first data sample, the second data sample, and the additional sensor data collected at time equals two. This pattern may continue until the next charge. Other events may correspond to a time equals zero event and subsequent data samples may be cumulative from the time equals zero event. Other events may include the start of a route, the start of a driver's shift, the first route of a day, and/or any other similar event. The corresponding ending event for these events may be the end of the route, the end of a driver's shift, and the last route of the day, respectively.

The model trainer 275 may train various models using machine learning and the training groups. The resulting models may be configured to receive data and output data based on the on the sensor data and labels included in the training group. For example, a first training group may include data identifying wireless energy received from the charger, miles driven, battery percentage, battery voltage, brake energy recovered, and a problem label. The resulting model trained from the first training group may be configured to receive data identifying wireless energy received from the charger, miles driven, battery percentage, battery voltage, and brake energy recovered and output data indicating a problem. A second training group may include data identifying wireless energy received from the charger, accessory usage, battery percentage, battery voltage, a problem label, and a solution label. The resulting model trained from the second training group may be configured to receive data identifying wireless energy received from the charger, accessory usage, battery percentage, battery voltage, and a problem, and output data indicating a solution to the problem.

Each model may be configured to receive and analyze the sensor data 225 in a cumulative manner. In this way, a model may not output a likely problem, cause, or solution with sensor data received at a single time. The model may output a likely problem, cause, or solution after receiving sensor data at multiple points in time. For example, a bus driver may begin a bus route. At the beginning of the bus route, the bus may provide sensor data to the server 200. The problem identifier 260 may select a model from the sensor data analysis models 240 based on the types of sensor data received. The selected model may not be able to determine whether there is a problem with one snapshot of data. As the bus continues to provide sensor data along the route, the problem identifier 260 may continue to provide the new sensor data to the selected model. Once the selected model has enough sensor data to generate an output, the selected model may output data identifying a likely problem or data indicating there is no problem.

The model trainer 275 may analyze the historical data 250 to identify patterns for generating the sensor data analysis rules 245. The model trainer 275 may identify sensor data patterns that correspond to different problems, causes, and/or solutions. These sensor data patterns may be various ranges, thresholds, and/or other similar comparison mechanisms to analyze the sensor data 225. For example, the model trainer 275 may analyze the historical data 250 and determine that there is a likely problem with the amount of energy recovered by the brake energy recoverer if the amount of brake energy recovered is not at least one kilowatt hour for each forty miles driven. The model trainer 275 may generate a sensor data analysis rule that indicates a problem exists with the brake energy recovery mechanism if the amount of energy recovered by the brake energy recoverer if the amount of brake energy recovered is not at least one kilowatt hour for each forty miles driven. The model trainer 275 may analyze the historical data 250 and determine that if battery level has dropped more than twenty percent, the vehicle has moved less than fifty miles, and the air conditioner has been running for more than two hours, then there is a problem with the amount of power used by the air conditioner.

In some implementations, the sensor data analysis rules 245 may include user-specified rules. These rules may be ones that indicate patterns, thresholds, and/or ranges to identify in the sensor data 225. If the sensor data 225 matches any of those patterns, threshold, and/or ranges, then the rules may specify whether a problem, cause, and/or solution is likely present. For example, a user-specified rule may indicate that if the temperature of a battery cell is at least ten degrees warmer than another battery cell, then there is a problem with the warm battery cell. Another user-specified rule may indicate that if the battery energy recoverer has been used for at least one hour and the energy recovered is less than one kilowatt hour, then there is a problem with the battery energy recoverer.

In some implementations, the historical data 250 may continue to update. As additional historical data 250 is added, the model trainer 275 may continue to generate additional data samples and retrain the sensor data analysis models 240, generate additional sensor data analysis rules 245, and/or update the patterns, thresholds, and/or ranges of the sensor data analysis rules 245. In some implementations, some of the historical data 250 may include data collected from vehicles and/or chargers that provided the sensor data 225 after a solution attempted to correct the problem and/or cause. In this way, the model trainer 275 may retrain the sensor data analysis models 240 using additional sensor data received from previously analyzed vehicles and/or chargers and problem, cause, and/or solution labels received from users.

Figure 3:
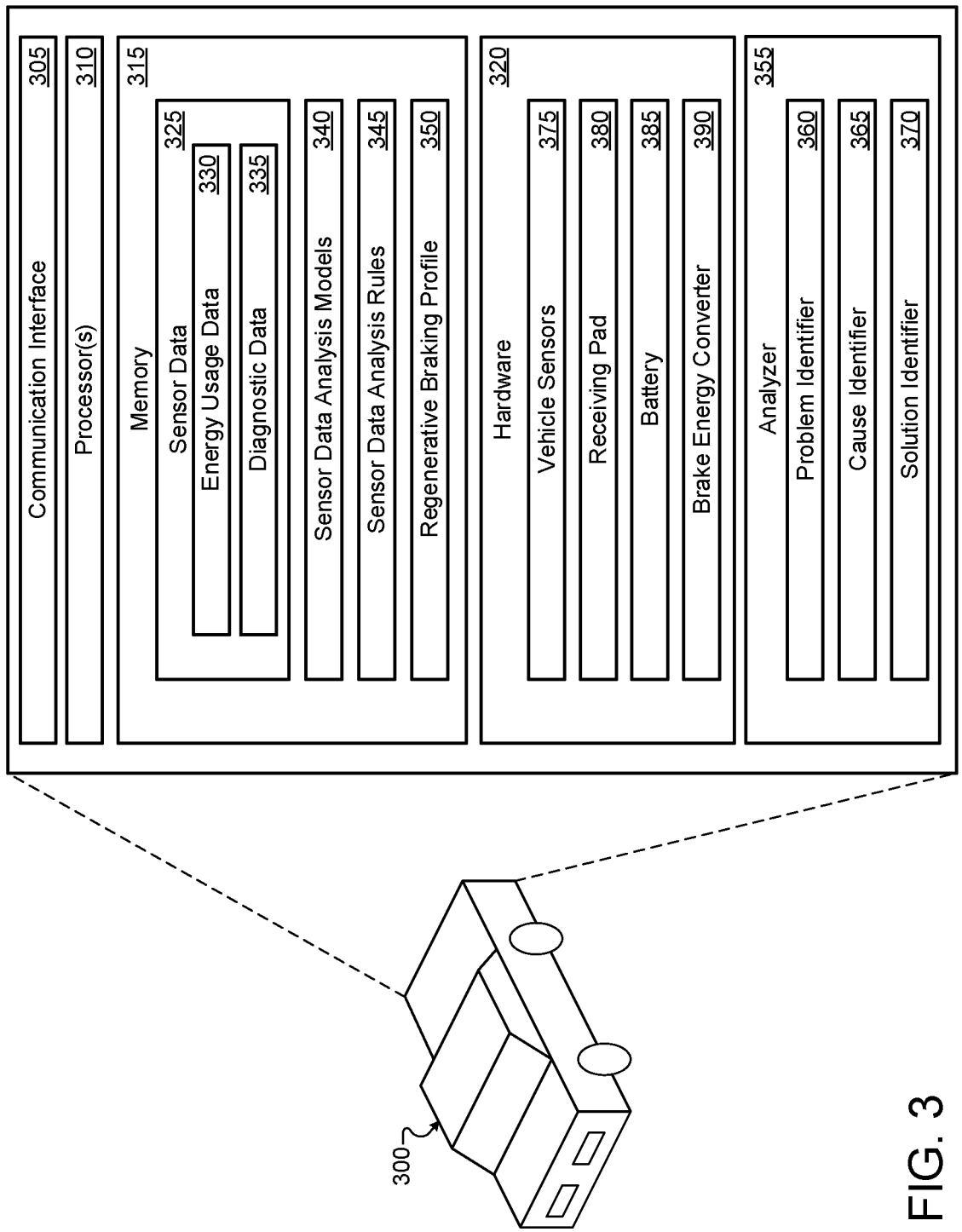
FIG. 3 illustrates an example vehicle that is configured to determine the cause of an issue with the electric vehicle.

FIG. 3 illustrates an example vehicle 300 that is configured to determine the cause of an issue with the electric vehicle 300. The vehicle 300 may be any type of electric vehicle that is capable of communicating with other vehicles and/or computing devices. The vehicle 300 may communicate with other vehicles and/or computing devices using a wide area network, a local area network, the internet, a wired connection, a wireless connection, and/or any other type of network or connection. The wireless connections may include Wi-Fi, short-range radio, infrared, and/or any other wireless connection. The vehicle 300 may be similar to the vehicle 104 of FIG. 1. Some of the components of the vehicle 300 may be implemented in a single vehicle or distributed over the vehicle 300 and various other devices that may communicate with the vehicle 300 but may not be included in the vehicle 300 as it travels. Some of the components may be in the form of virtual machines or software containers that are hosted in a cloud in communication with disaggregated storage devices.

The vehicle 300 may include a communication interface 305, one or more processors 310, memory 315, and hardware 320. The communication interface 305 may include communication components that enable the vehicle 300 to transmit data and receive data from other devices and networks. In some implementations, the communication interface 305 may be configured to communicate over a wide area network, a local area network, the internet, a wired connection, a wireless connection, and/or any other type of network or connection. The wireless connections may include Wi-Fi, short-range radio, infrared, and/or any other wireless connection.

The memory 315 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The memory 315 may store sensor data 325. The sensor data 325 may be similar to the sensor data of FIG. 1 and the sensor data 225 of FIG. 2. Like the sensor data of FIG. 1 and the sensor data 225 of FIG. 2, the sensor data 325 may include energy usage data 330 and diagnostic data 335. The energy usage data 330 may be similar to the energy usage data 128 of FIG. 1 and the energy usage data 230 of FIG. 2, and the diagnostic data 335 may be similar to the diagnostic data 130 of FIG. 1 and the diagnostic data 235 of FIG. 2. The sensor data 325 may store data related to the vehicle 300. The sensors 375 may generate sensor data, and the processor(s) 310 may determine whether that data should be stored in the energy usage data 330 or the diagnostic data 335. In some implementations, the sensor data 325 may not differentiate between the energy usage data 330 or the diagnostic data 335. In this case, the processor(s) 310 may store that data in the sensor data 325. In some implementations, the processor(s) 310 may timestamp the received data to indicate when the sensors 375 generated the sensor data 325. In some implementations, the sensor data 325 may already be timestamped by the corresponding sensor upon collection. In some implementations, the sensor data 325 may also include charger sensor data received from chargers with which the vehicle 300 interacted. For example, the vehicle 300 may receive wireless power from a charger. The charger may also communicate with the vehicle and provide charger sensor data that the vehicle 300 may store in the sensor data 325.

The hardware 320 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The hardware 320 may also include vehicle sensors 375, a receiving pad 380, a battery 385, and a brake energy converter 390. The vehicle sensors 375 may be similar to the vehicle sensors 116 of FIG. 1. The vehicle sensors 375 may be configured to collect data related to the characteristics of the vehicle 300, the various components of the vehicle 300, and the environment in and around the vehicle 300. The receiving pad 380 may be similar to the receiving pad 122 of FIG. 1. The receiving pad 380 may be configured to receive wireless energy from a charging pad of a charger. The battery 385 may be similar to the battery 118 of FIG. 1. The battery 385 may store and provide power to the vehicle 300. The brake energy converter 390 may be similar to the brake energy recoverer 124 of FIG. 1. The brake energy converter 390 may be configured to convert the kinetic energy of the vehicle into energy that can be stored in the battery 385. This slows down the vehicle 300 in the process.

The one or more processors 310 may implement the analyzer 355. The analyzer 355 may be similar to the analyzer 132 of FIG. 1 and the analyzer 255 of FIG. 2. Like the analyzer 132 and the analyzer 255, the analyzer 355 may be configured to analyze the sensor data 325 using the problem identifier 360, the cause identifier 365, and the solution identifier 370. The problem identifier 360 may be similar to the problem identifier 134 of FIG. 1 and the problem identifier 260 of FIG. 2. The cause identifier 365 may be similar to the cause identifier 136 of FIG. 1 and the cause identifier 265 of FIG. 2. The solution identifier 370 may be similar to the solution identifier 138 of FIG. 1 and the solution identifier 270 of FIG. 2. The problem identifier 360 may analyze the energy usage data 330 and/or the diagnostic data 335 related to a vehicle to determine whether there are any problems with that vehicle 300. If the problem identifier 360 detects a problem, then the cause identifier 365 may analyze the problem, the energy usage data 330, and/or the diagnostic data 335 to determine the cause of the problem with the vehicle 300. The solution identifier 370 may analyze the problem, cause, the energy usage data 330, and/or the diagnostic data 335 to determine the solution to the cause of the problem with the vehicle 300. The problem identifier 360, the cause identifier 365, and the solution identifier 370 may use the sensor data analysis models 340 and/or the sensor data analysis rules 345 to analyze the problem, cause, the energy usage data 330, and/or the diagnostic data 335.

The memory 315 may store the sensor data analysis models 340 and the sensor data analysis rules 345. The sensor data analysis models 340 may be similar to the sensor data analysis models 240 of FIG. 2. The sensor data analysis rules 345 may be similar to the sensor data analysis rules 245 of FIG. 2. The problem identifier 360, the cause identifier 365, and the solution identifier 370 may use the sensor data analysis models 340 and the sensor data analysis rules 345 to analyze the sensor data 325 in a similar manner to the problem identifier 260, the cause identifier 265, and the solution identifier 270 using the sensor data analysis models 240 and the sensor data analysis rules 245 to analyze the sensor data 225.

The vehicle 300 may receive the sensor data analysis models 340 and the sensor data analysis rules 345 from a server such as the server 106 of FIG. 1 and/or the server 200 of FIG. 2. The server 106 and/or the server 200 may train and generate the sensor data analysis models 340 and the sensor data analysis rules 345. The server 106 and/or the server 200 may train and generate the sensor data analysis models 340 and the sensor data analysis rules 345 in part using the sensor data 325 that the vehicle 300 provides to the server 106 and/or the server 200. In some implementations, the server 106 and/or the server 200 may train and generate updated sensor data analysis models and sensor data analysis rules. In this case, the server 106 and/or the server 200 may provide the updated sensor data analysis models and sensor data analysis rules. The problem identifier 260, the cause identifier 265, and the solution identifier 270 may then use the updated sensor data analysis models 340 and the sensor data analysis rules 345.

The memory 315 may store a regenerative braking profile 350. The regenerative braking profile 350 may be similar to the regenerative braking profile 120 of FIG. 1. The regenerative braking profile 350 may store various regenerative braking profiles. While the vehicle 300 is moving one of the regenerative braking profiles may be flagged as active. The brake energy converter 390 may be use the active regenerative braking profile to determine how to operate. In some implementations, a regenerative braking profile may be linked to a specific driver. In this case, the driver may select a regenerative braking profile linked to the driver. In some instances, the vehicle 300 may determine the identity of the driver and select the appropriate regenerative braking profile automatically. The regenerative braking profiles 350 may include a default profile that the brake energy converter 390 may use if the brake energy converter 390 does not determine which profile to use. In some implementations, a regenerative braking profile may be linked to a specific route. In this case, the driver may select a regenerative braking profile linked to the route. In some implementations, the vehicle 300 may determine the route based on the movement and location of the vehicle 300.

Integrating the above components into the vehicle 300 may allow the vehicle 300 to identify problems, causes, and solutions. In instances where the solution is something that can be automatically implemented, the vehicle 300 may automatically implement the solution without user intervention. These solutions may include those that include software updates, adjustments to hardware that can be remotely controlled, and/or any similar changes. The hardware or software may be part of the vehicle 300 or part of a charger.

Figure 4:
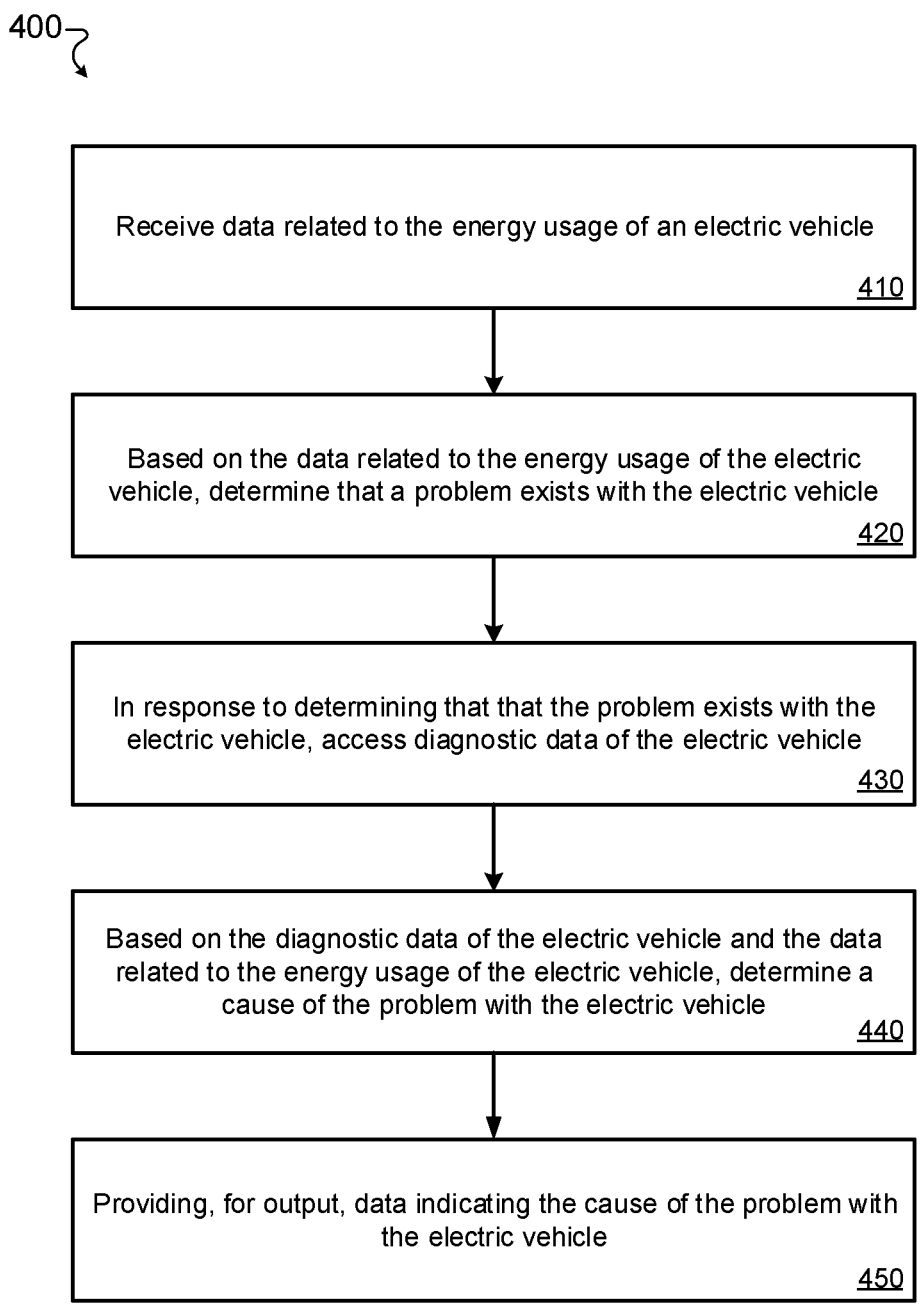
FIG. 4 is a flowchart of an example process for determining the cause of an issue with a wireless power transfer system or electric vehicle.

FIG. 4 is a flowchart of an example process 400 for determining the cause of an issue with a wireless power transfer system or electric vehicle. In general, the process 400 analyzes energy usage data and diagnostic data received from a wireless power transfer system and/or an electric vehicle. The process 400 determines whether there is a problem with the wireless power transfer system and/or the electric vehicle. If there is a problem, then the process 400 determines the cause and a solution to correct the cause of the problem. The process 400 may implement the solution. The process 400 will be described as being performed by the server 106 of FIG. 1 and will include references to components of the FIG. 1. In some implementations, the process 400 may be performed by the server 200 of FIG. 2 and/or the vehicle 300 of FIG. 3.

The server 106 receives data related to the energy usage of an electric vehicle 104 (410). The server 106 may receive the data from the vehicle 104 and/or the charger that may include a charging pad 110 charger circuitry 112. The data may be related to an amount of power provided from the charger to the vehicle 104, the amount of power consumed by a motor of the vehicle, an amount of power received by the vehicle 104 from the charger, an amount of power consumed and/or remaining in the battery 118 of the vehicle 104, the voltage of the battery 118, distance traveled by the vehicle 104, accessory usage of the vehicle 104, regenerative braking data, and/or any other similar energy usage related data. In some implementations, the vehicle 104 includes a receiving pad 122 that received wireless power from the charging pad 110 of the charger.

Based on the data related to the energy usage of the electric vehicle, the server 106 determines that a problem exists with the electric vehicle 104 (420). The server 106 may use various rules and/or models to determine whether a problem exists with the vehicle 104. In some implementations, the problem may be that the vehicle is using too much power relative to the distance traveled, the battery power may be decreasing too quickly, the power output by the charger indicates that the battery 118 should be charged more, the power received by the charger indicates that more power should be output by the charger, and/or any other similar problem. In some implementations, the problem may be related to something other than a power related problem. For example, the problem may be that the interior of the vehicle 104 is too dark, the moisture detected in an are of the vehicle or charger is outside of an acceptable range, the temperature inside the vehicle 104 is outside of an acceptable range, and/or any other similar problem.

In response to determining that that the problem exists with the electric vehicle, the server 106 accesses diagnostic data of the electric vehicle 104 (430). In some implementations, the diagnostic data may include battery temperature data, brake energy recovery data, accessory usage, speed data, tire pressure data, accelerometer data, magnetometer data, location data, light sensor data, gravity sensor data, presence detection data, and/or any other similar type of data. In some implementations, the server 106 receives the diagnostic data from the vehicle 104 periodically, in response to an event, and/or in response to a request. The server 106 may store the diagnostic data and access the diagnostic data in response to identifying the problem with the vehicle 104.

Based on the diagnostic data of the electric vehicle and the data related to the energy usage of the electric vehicle, the server 106 determines a cause of the problem with the electric vehicle 104 (440). The server 106 may use various models and/or rules to analyze the diagnostic data and the energy usage data. In some implementations, the models may be trained using historical data and machine learning.

The models may be configured to receive the diagnostic data, the energy usage data, the problem, and/or the cause and output data indicating the problem, the cause, and/or the solution.

In some implementations, the server 106 identifies the cause of the problem in a two step approach that involved analyzing different portions of data. The different portions may including overlapping data. The server 106 may analyze a portion of the data that includes energy usage data that may not include diagnostic data. In this way, the server 106 may quickly determine whether the vehicle 104 has a problem without analyzing data that includes both the energy usage data and the diagnostic data. This may speed up the problem identification process. If the server 106 identifies a problem, then the server 106 may analyze the energy usage data and the diagnostic data to determine the cause and/or a solution.

In some implementations, the server 106 identifies the problem by analyzing the energy usage data and the diagnostic data. The server 106 accesses the energy usage data and the diagnostic data periodically, in response to an event, and/or in response to a request. The server 106 analyzes the energy usage data and the diagnostic data using the models and/or the rules and determines whether there is a problem. While analyzing the energy usage data and the diagnostic data may increase the time period and computing resources used to identify a likely problem, the accuracy of the problem identification may be improved.

The server 106 provides, for output, data indicating the cause of the problem with the electric vehicle 104 (450). In some implementations, the server 106 determines a solution to address the cause. The server 106 may output data identifying the problem, cause, and/or solution. The server 106 may output instructions to address the cause and/or solution. The vehicle 104 and/or another device may receive the instructions. The vehicle 104 and/or other device may automatically implement the instructions. In some implementations, the instructions may include actions for a user, such as the driver, to take. For example, the actions may be for the driver to take additional training for driving the vehicle 104.

In some implementations, the server 106 may determine that the cause of the problem with the vehicle 104 is that the regenerative braking profile of the user 102 does not regenerative braking profile that the vehicle 104 is using. In this case, the server 106 may identify the correct regenerative braking profile and instruct the vehicle 104 to use that regenerative braking profile. In some implementations, the server 106 may determine that the cause of the problem is the driving patterns of the user 102. In this case, the server 106 may recommend that the user 102 drive according to the recommended driving pattern, which may include additional training for the user 102. In some implementations, the server 106 may determine that the cause of the problem is that the auxiliary power load of the vehicle 104 is too high for the usage of the vehicle 104. In this case, the server 106 may instruct the user 102 to decrease the auxiliary power load of the vehicle 104 which may include actions like turning off the interior lights and passenger air conditioning system when the vehicle 104 is not carrying passengers.

Although a few implementations have been described in detail above, other modifications are possible. In addition, the logic flows depicted in the figures do not require the particular order shown, or sequential order, to achieve desirable results. In addition, other acts/actions may be provided, or acts/actions may be eliminated, from the described flows, and other components may be added to, or removed from, the described systems. Accordingly, other implementations are within the scope of the following claims.

What is claimed is:

1. A computer-implemented method, comprising:
receiving, by a computing device, data related to energy usage of an electric vehicle, wherein the computing device is located within the electric vehicle;
based on the data related to the energy usage of the electric vehicle, determining, by the computing device, that a problem exists with the electric vehicle;
in response to determining that the problem exists with the electric vehicle, accessing, by the computing device, diagnostic data of the electric vehicle;
based on the diagnostic data of the electric vehicle and the data related to energy usage of the electric vehicle, determining, by the computing device, a cause of the problem with the electric vehicle, wherein determining, by the computing device, a cause of the problem with the electric vehicle comprises determining, while a driver is driving the electric vehicle, that a regenerative braking profile of the electric vehicle does not match a current driving pattern of the driver of the electric vehicle;
determining, by the computing device, an additional regenerative braking profile of the electric vehicle that matches the driving pattern of the driver of the electric vehicle while the driver is driving the electric vehicle; and
updating, by the computing device, the regenerative braking profile of the electric vehicle to the additional regenerative braking profile of the electric vehicle while the driver is driving the electric vehicle.

2. The computer-implemented method of claim 1, wherein the regenerative braking profile specifies to decelerate the electric vehicle based on a distance between the electric vehicle and a predetermined location.

3. The computer-implemented method of claim 1, wherein the electric vehicle includes a receiving pad that is configured to receive power wirelessly from a charging pad.

4. The computer-implemented method of claim 1, wherein:
determining the cause of the problem with the electric vehicle comprises additionally determining while the driver is driving the electric vehicle that driving patterns of the driver of the electric vehicle are a cause of the problem with the electric vehicle, and
the computer-implemented method further comprises:
determining, by the computing device, a recommended driving pattern for the driver of the electric vehicle; and
providing, for output by the computing device, instructions for the driver to drive the electric vehicle according to the recommended driving pattern.

5. The computer-implemented method of claim 1, wherein determining the cause of the problem with the electric vehicle comprises:
providing, as an input to a model, the diagnostic data of the electric vehicle and the data related to the energy usage of the electric vehicle; and
receiving, from the model, data indicating the cause of the problem with the electric vehicle.

6. The computer-implemented method of claim 5, comprising:
receiving, by the computing device, historical data that includes previous data related to the energy usage of the electric vehicle, previous diagnostic data of the electric vehicle, and previous data indicating a cause of a previous problems of the electric vehicle; and training, by the computing device, the model using the historical data.

7. The computer-implemented method of claim 1, wherein:

determining the cause of the problem with the electric vehicle comprises additionally determining while the driver is driving the electric vehicle that an auxiliary power load of the electric vehicle is a cause of the problem with the electric vehicle, and the computer-implemented method further comprises:
providing, for output by the computing device, instructions for the driver to adjust the auxiliary power load of the electric vehicle.

8. A system, comprising:

one or more processors; and memory including a plurality of computer-executable components that are executable by the one or more processors to perform a plurality of actions, the plurality of actions comprising:

receiving, by a computing device, data related to energy usage of an electric vehicle, wherein the computing device is located within the electric vehicle;

based on the data related to energy usage of the electric vehicle, determining, by the computing device, that a problem exists with the electric vehicle;

in response to determining that the problem exists with the electric vehicle, accessing, by the computing device, diagnostic data of the electric vehicle;

based on the diagnostic data of the electric vehicle and the data related to energy usage of the electric vehicle, determining, by the computing device, a cause of the problem with the electric vehicle, wherein determining, by the computing device, a cause of the problem with the electric vehicle comprises determining, while a driver is driving the electric vehicle, that a regenerative braking profile of the electric vehicle does not match a current driving pattern of a driver of the electric vehicle;

determining, by the computing device, an additional regenerative braking profile of the electric vehicle that matches the driving pattern of the driver of the electric vehicle while the driver is driving the electric vehicle; and updating, by the computing device, the regenerative braking profile of the electric vehicle to the additional regenerative braking profile of the electric vehicle while the driver is driving the electric vehicle.

9. The system of claim 8, wherein:

the regenerative braking profile specifies to decelerate the electric vehicle based on a distance between the electric vehicle and a predetermined location.

10. The system of claim 8, wherein the electric vehicle includes a receiving pad that is configured to receive power wirelessly from a charging pad.

11. The system of claim 8, wherein:

determining the cause of the problem with the electric vehicle comprises additionally determining while the driver is driving the electric vehicle that driving patterns of the driver of the electric vehicle are a cause of the problem with the electric vehicle, and the plurality of actions further comprising:
determining, by the computing device, a recommended driving pattern for the driver of the electric vehicle; and providing, for output by the computing device, instructions for the driver to drive the electric vehicle according to the recommended driving pattern.

12. The system of claim 8, wherein determining the cause of the problem with the electric vehicle comprises:

providing, as an input to a model, the diagnostic data of the electric vehicle and the data related to the energy usage of the electric vehicle; and receiving, from the model, data indicating the cause of the problem with the electric vehicle.

13. The system of claim 12, wherein the plurality of actions comprise:

receiving, by the computing device, historical data that includes previous data related to the energy usage of the electric vehicle, previous diagnostic data of the electric vehicle, and previous data indicating a cause of a previous problems of the electric vehicle; and training, by the computing device, the model using the historical data.

14. The system of claim 8, wherein:

determining the cause of the problem with the electric vehicle comprises additionally determining while the driver is driving the electric vehicle that an auxiliary power load of the electric vehicle is a cause of the problem with the electric vehicle, and the computer-implemented method further comprises:
providing, for output by the computing device, instructions for the driver to adjust the auxiliary power load of the electric vehicle.

15. One or more non-transitory computer-readable media of a computing device storing computer-executable instructions that upon execution cause one or more computers to perform acts comprising:

receiving, by a computing device, data related to energy usage of an electric vehicle, wherein the computing device is located within the electric vehicle;

based on the data related to the energy usage of the electric vehicle, determining, by the computing device, that a problem exists with the electric vehicle;

in response to determining that the problem exists with the electric vehicle, accessing, by the computing device, diagnostic data of the electric vehicle;

based on the diagnostic data of the electric vehicle and the data related to energy usage of the electric vehicle, determining, by the computing device, a cause of the problem with the electric vehicle, wherein determining, by the computing device, a cause of the problem with the electric vehicle comprises determining, while a driver is driving the electric vehicle, that a regenerative braking profile of the electric vehicle does not match a current driving pattern of a driver of the electric vehicle;

determining, by the computing device, an additional regenerative braking profile of the electric vehicle that matches the driving pattern of the driver of the electric vehicle while the driver is driving the electric vehicle; and updating, by the computing device, the regenerative braking profile of the electric vehicle to the additional regenerative braking profile of the electric vehicle while the driver is driving the electric vehicle.

16. The one or more non-transitory computer-readable media of claim 15, wherein the regenerative braking profile specifies to decelerate the electric vehicle based on a distance between the electric vehicle and a predetermined location.

17. The one or more non-transitory computer-readable media of claim 15, wherein the electric vehicle includes a receiving pad that is configured to receive power wirelessly from a charging pad.

* * * * *